(12) United States Patent
Jannotta et al.

(10) Patent No.: US 8,069,722 B1
(45) Date of Patent: Dec. 6, 2011

(54) TANK GAGE HATCH ASSEMBLY

(75) Inventors: Louis J. Jannotta, Orland Park, IL (US); Jeffrey D. Clay, Oakbrook, IL (US)

(73) Assignee: L&J Engineering, Inc., Hillside, IL (US)

( * ) Notice: Subject to any disclaimer, the term of this patent is extended or adjusted under 35 U.S.C. 154(b) by 377 days.

(21) Appl. No.: 12/455,277

(22) Filed: May 28, 2009

Related U.S. Application Data

(60) Provisional application No. 61/060,058, filed on Jun. 9, 2008.

(51) Int. Cl.
   *G01F 23/00* (2006.01)
(52) U.S. Cl. ........................................... 73/290 V
(58) Field of Classification Search ............... 73/290 V, 73/290 R
   See application file for complete search history.

(56) References Cited

U.S. PATENT DOCUMENTS

| | | | | |
|---|---|---|---|---|
| 3,421,781 A * | 1/1969 | Spurk | | 285/148.22 |
| 3,941,460 A * | 3/1976 | Meginnis | | 359/894 |
| 4,468,095 A * | 8/1984 | Meginnis | | 359/894 |
| 4,566,321 A * | 1/1986 | Zacchio | | 73/290 R |
| 4,609,209 A * | 9/1986 | Ralls | | 285/24 |
| 5,507,181 A * | 4/1996 | Fox et al. | | 73/290 V |
| 5,851,083 A * | 12/1998 | Palan | | 403/337 |
| 6,337,655 B1 * | 1/2002 | Wilkie et al. | | 342/124 |
| 6,538,598 B1 * | 3/2003 | Wilkie et al. | | 342/124 |
| 6,658,932 B2 * | 12/2003 | Munley et al. | | 73/290 V |
| 6,928,867 B2 * | 8/2005 | Reimelt et al. | | 73/290 V |
| 7,082,828 B1 * | 8/2006 | Wilkins | | 73/313 |
| 7,134,315 B1 * | 11/2006 | Stigler et al. | | 73/290 V |
| 7,255,002 B2 * | 8/2007 | Gravel et al. | | 73/290 V |
| 7,328,611 B2 * | 2/2008 | Klees et al. | | 73/290 V |
| 2003/0121324 A1 * | 7/2003 | Beechie | | 73/290 B |
| 2007/0261487 A1 * | 11/2007 | Sintes et al. | | 73/290 V |
| 2009/0178478 A1 * | 7/2009 | Reimelt et al. | | 73/290 V |

* cited by examiner

*Primary Examiner* — Hezron E Williams
*Assistant Examiner* — Rodney T Frank
(74) *Attorney, Agent, or Firm* — Stout, Uxa, Buyan & Mullins; Frank J. Uxa

(57) ABSTRACT

A tank gage assembly is provided including a tank gage antenna operatively couplable to a tank gage; a cover coupled to the tank gage antenna; a gage hatch flange including an opening and being coupled to the cover and structured to be coupled to a tank; and a hinge having a first hinge member secured to the gage hatch flange, and a second hinge member secured to the cover, the hinge being movable between a first position in which the cover is spaced apart from the opening and a second position in which the antenna and cover substantially cover the opening.

21 Claims, 4 Drawing Sheets

TANK GAGE HATCH ASSEMBLY

This application claims the benefit of U.S. Provisional Application Ser. No. 61/060,058, filed Jun. 9, 2008, which is hereby incorporated herein in its entirety by reference.

BACKGROUND OF THE INVENTION

The present invention generally relates to tank gage hatch assemblies, and more particularly to tank gage hatch assemblies which allow multiple uses for the tank opening in which automatic, for example, electronic or radar, gages are installed, for example, to measure and/or monitor liquid levels in such tank.

In modern day management of storage tanks, for example, petroleum and petroleum product storage tanks and the like, automatic gages, such as electronic or radar gages and the like, are frequently used in measuring and/or monitoring and/or managing the level of liquid in such tanks. Using such an automatic gage often requires that the gage assembly, including the gage and an antenna, often called or known as a horn, for communication purposes, be secured to an opening in the tank to allow for effective measuring/monitoring of the liquid level in the tank.

However, in many applications, the operator of the tank wants to use the tank opening for more than one purpose, that is for more than just providing for the installation of the automatic gage. For example, one additional purpose that might be desired by the tank operator is the ability to hand gage the tank, such as by dropping a gage tape down the tank opening, to calibrate the automatic gage, to verify the accuracy of the automatic gage, to confirm the measurements of automatic gage, etc. This hand gauging of the tank is done only occasionally, while the rest of the time the automatic gauge is mounted to the tank over the tank opening.

Having a dual or multiple capability of a tank opening provides additional operating flexibility to the tank operator and is especially useful on existing tanks where there is an existing tank opening. The size of such existing tank openings may vary widely, for example, with diameters in the range of about two inches to about twelve inches or more. It would be advantageous to mount an automatic gage in such an existing tank opening, while still allowing for one or more other uses of the tank opening.

The sensitivity of certain electronic or radar gages, which employ an antenna, often called or referred to as a horn, and wireless signals to communicate to a central monitoring location, makes removing the gage from the opening a somewhat risky proposition in that the gage may not be accurate once the gage is placed back into service, and may need calibrating, adjusting and/or other maintenance, which can be both costly and time consuming, to restore acceptable gage performance.

Systems have been developed for removing the antenna of such gages from the opening of the tank in order to allow the tank opening to be used for other purposes. For example, hinged gage mounts have been used but require special mounting brackets which consume more time to install. Such prior systems may require that more things be unbolted to gain access to the tank opening. Such issues result in increased cost and time inefficiencies.

There continues to be a need for a tank gage hatch assembly which can be easily installed to allow convenient and quick access to a tank opening for other purposes, as desired, while still allowing a tank gage, such as an electronic or radar gage, to be located at the tank opening for use, for example, for a majority of the time, and, after the gage is placed back in service over the tank opening, to allow the gage to operate effectively and accurately.

SUMMARY OF THE INVENTION

Tank gage hatch assemblies have been discovered which provide substantial advantages, for example, and without limitation, in dealing with the issues noted elsewhere herein.

The present tank gage assemblies provide substantial advantages over prior assemblies. For example, the present tank gage hatch assemblies can be easily installed, for example, without modifying or otherwise augmenting the tank opening and/or associated hardware. Thus, in one embodiment, the present tank gage hatch assembly can be very effectively used to replace a prior assembly simply by securing the present tank gage hatch assembly to the existing tank opening.

Further, the present tank gage hatch assemblies can be very easily and quickly manipulated so as to allow the tank opening to be used for a purpose other than as an access point for an automatic gage, for example, an electronic or radar liquid level gage and the like. This manipulation, in one embodiment, can be effected without removing any portion of the antenna relative to the remainder of the gage so that when the antenna and gage are again placed in operating position, e.g., so that the gage can monitor the liquid level in the tank, the gage and antenna operate to do so effectively and accurately, and with reduced risk, e.g., relative to prior hatch assemblies, of requiring maintenance to provide acceptable performance.

In one broad aspect of the present invention, tank gage hatch assemblies are provided which comprise a tank gage antenna, a cover, a gage hatch flange, and a hinge. The tank gage antenna is operatively couplable to a tank gage, for example and without limitation, a liquid level gage associated with a tank, such as a liquid storage tank and the like. The cover is coupled to the tank gage antenna. The gage hatch flange includes an opening and is coupled to the cover and is structured to be coupled to a tank, for example and without limitation, a liquid storage tank. The hinge comprises a first hinge member secured to the gage hatch flange, and a second hinge member secured to the cover. The hinge is movable between a first or open position in which the cover is spaced apart from the opening and a second or closed position in which the antenna and the cover substantially cover or close the opening.

In one embodiment, the tank gage hatch assembly of the present invention is structured to be used as a replacement for a prior, for example, differently structured, gage hatch assembly on an existing tank. The present tank gage hatch assembly may be structured to replace any gage hatch assembly that uses a standard size ANSI flange, for example and without limitation, a standard sized 2 inch to 12 inch ANSI flange.

In a useful embodiment, the hinge of the tank gage hatch assembly is movable from the second position to the first position without disconnecting anything from the antenna. This feature allows the opening to be uncovered substantially without disrupting the antenna.

The tank gage hatch assembly may further comprise a first latch component secured to the antenna or cover and a second latch component secured to the gage hatch flange. The first and second latch components may be structured to be coupled together when the hinge is in the second position to secure the antenna and cover in place relative to the opening. The second latch component and first hinge member may be secured to the gage hatch flange at substantially neutrally opposing locations.

In one embodiment, the first latch component may include two spaced apart prongs extending outwardly from the antenna or cover; and the second latch component may include a shaft sized and adapted to be placed between the two prongs when the hinge is in the second position, so that the antenna and cover substantially cover the opening.

The tank gage hatch assembly may further comprise a nut element threadably coupled to the shaft, which nut element is sized and structured to be rotated relative to the shaft, as desired, to secure the antenna and cover to the gage hatch flange when the hinge is in the second position. The shaft may be movable so that the shaft can be removed from between the two prongs without removing the nut element from the shaft.

In one embodiment, the tank gage hatch assembly is structured to be self-aligning in moving the hinge, or when the hinge is moved, from the first position to the second position.

The cover may have a ring-like structure having an inner wall with a first taper away from the antenna. The gage hatch flange may include a shaped element defining the opening. The shaped element may include an outer surface with a second taper which is substantially complimentary to the first taper, so that the first and second tapered surfaces are substantially in contact with the hinge member when the hinge member is in the second position.

In one embodiment, the cover may be secured to the antenna, for example, using a plurality of cap head screws.

The tank gage hatch assembly may further include a pedal member secured to at least one element of the assembly. The pedal member may be effective in facilitating moving the hinge between the first and second positions, for example, from the second position to the first position. For example, the pedal member may be coupled to the hinge, and may extend generally outwardly from the hinge.

In a useful embodiment, the movement of the hinge may be cushioned to limit the occurrence and/or severity of shocks when moving the hinge between the first and second positions, for example, from the second position to the first position. The tank gage hatch assembly may further comprise at least one cushion component, for example and without limitation, located on the hinge and/or on the gage hatch flange, to provide the cushioning, for example, of the hinge movement. The cushion component may be any suitable element or combination of elements effective to provide the desired cushioning. In one embodiment, the cushion component is selected from the group consisting of a spring, a polymeric element, a rubber stop and the like and combinations thereof.

In one embodiment, the antenna has an outer surface with a substantially linear taper. The antenna may have an outer surface with a substantially log taper.

The tank gage hatch assembly may further comprise a housing structured to at least partially contain the tank gage. The housing may be coupled to the antenna. The housing may include an outwardly extending port including a first threaded surface, such as a threaded outer surface. The tank gage hatch assembly may further comprise an end cap located on the antenna and having a second threaded surface, such as a threaded inner surface, so that the housing can be secured to the antenna by rotating the end cap onto the port.

In one embodiment, the present tank gage hatch assembly can be mounted to a tank without special mounting brackets. This reduces the time, effort and equipment required to install the present tank gage hatch assembly, for example, relative to prior hatch assemblies.

In short, the present tank gage assemblies are relatively straight forward in construction and structure, are easily and quickly installed, e.g., secured to a tank, can easily and quickly be manipulated so as to provide access to the tank opening for a purpose other than using an automatic gage; can be manipulated without disturbing or damaging or disassembling the antenna of the gage; and can be easily and quickly repositioned, e.g., on the tank opening, so as to again permit use of the automatic gage with little or no risk of requiring recalibration, maintenance and the like, of the gage. The present tank gage hatch assemblies are a substantial advance relative to prior art assemblies.

Various embodiments of the present invention are described in detail in the detailed description and additional disclosure herein. Any feature or combination of features described herein are included within the scope of the present invention provided that the features included in any such combination are not mutually inconsistent as will be apparent from the context, this specification, and the knowledge of one of ordinary skill in the art. In addition, any feature or combination of features may be specifically excluded from any embodiment of the present invention.

These and other aspects and advantages of the present invention are set forth in the following detailed description, drawings and additional disclosure in claim format. In the drawings, like parts are identified by like or similar reference numerals.

DETAILED DESCRIPTION OF THE INVENTION

Figure 1:
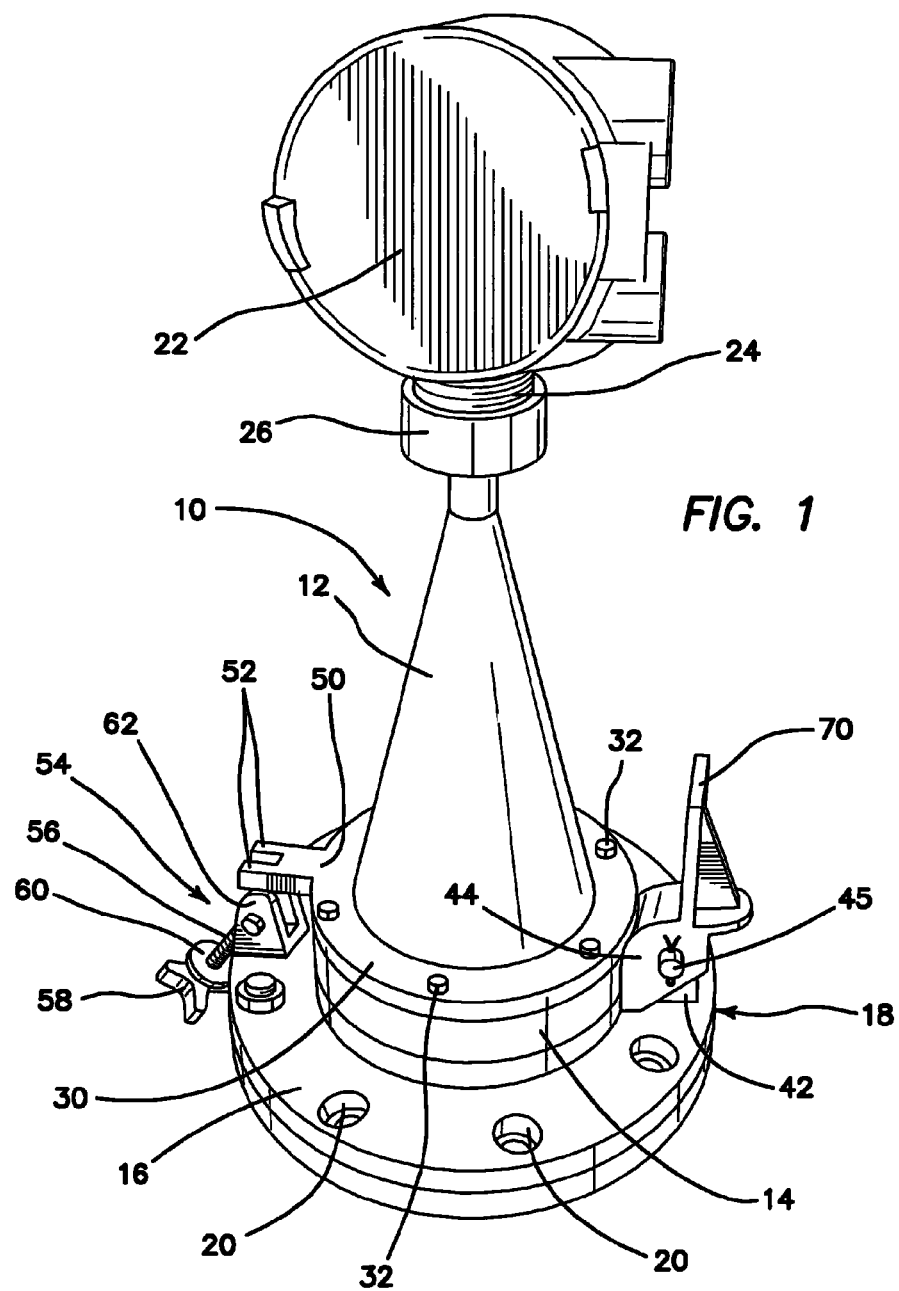
FIG. 1 is a photograph showing a back side view of one embodiment of a tank gage hatch assembly in accordance with the present invention.

With reference to FIG. 1, the present tank gage hatch assembly, shown generally at 10, includes a tank gage antenna or horn 12, a cover 14, a gage hatch flange 16 and a hinge, shown generally at 18.

The tank gage hatch assembly 10 can be easily and routinely bolted to the opening in a storage tank, for example, using bolts (not shown) passing through gage hatch flange 16, specifically through the bolt holes 20 in gage hatch flange 16 and through corresponding holes in a tank opening flange, not shown.

The tank gage antenna 12 is coupled to gage housing 22 in which is located an automatic liquid level gage, for example, an electronic or radar gage 23 (See FIG. 4), such as the gage sold by L&J Technologies, Inc., under the tradename MCG 1600. Of course, other automatic, e.g., electronic and/or radar, gages may be employed in or with the present tank gage hatch assemblies. The gage housing 22 includes a threaded port 24. One end of antenna 12 has associated with it an end cap 26 which includes internal threads which are complimentary to the threads of threaded port 24. Thus, by rotating end cap 26 relative to port 24, the antenna can be secured to the gage housing 22 and the automatic gage contained within such housing.

The other end of antenna 12 is provided with an outwardly extending antenna flange 30.

The cover 14 is secured to the underside of the antenna flange 30 by means of cap head screws 32, for example, located at substantially equidistant points around the antenna flange 30. The cover 14 is described in some detail hereafter.

The hinge 18 includes a first hinge member 42 secured to the gage hatch flange 16, for example, by bolting, adhesives, or the like means. A second hinge member 44 is secured to the cover 14, for example, by bolting, adhesives, or the like means. The hinge 18 is movable, for example, by rotating the second hinge member 44 relative to the first hinge member 42 around axle bolt 45, which extends through both the first and second hinge members, between a first position, for example, shown in FIG. 3, in which the cover 14 is spaced apart from the opening 46, defined by the gage hatch flange 16; and a second position, shown in FIG. 1, in which the antenna 12 and cover 14 substantially cover the above-noted opening 46. With the gage hatch flange 16 bolted to the opening of a tank, for example, a storage tank, the opening 46 may substantially coincide, for example, in position and/or in size with the tank opening.

As shown in FIG. 1, assembly 10 also includes a first latch component 50 and a second latch component 54. As shown in FIG. 1, the first latch component 50 is part of the antenna flange 30 and includes two spaced apart fingers or prongs 52.

The second latch component 54 is secured to the gage hatch flange 16. The second latch component 54 includes a threaded shaft 56 sized and adapted to be placed between the two prongs 52 of the first latch component 50 when the hinge is in the second position so that the antenna 12 and cover 14 substantially cover the opening 46. Second latch component 54 also includes a nut element 58 which is threadably coupled to the shaft 56. The nut element 58 is sized and structured to be rotated relative to the shaft 56, as desired, to secure the antenna 12 and cover 14 to the gage hatch flange 16 when the hinge 18 is in the second position.

A conventional washer 60 can be placed on the shaft 56, as shown, so as to provide a degree of cushioning between the nut element 58 and the first latch component when the nut element is threaded on the shaft 56 toward the first latch component 50. This washer 60 protects the first latch component from damage and, in addition, may reduce or substantially eliminate interference with the functioning of antenna 12 caused by the presence of the nut element 58 near the first latch component 50.

Figure 3:
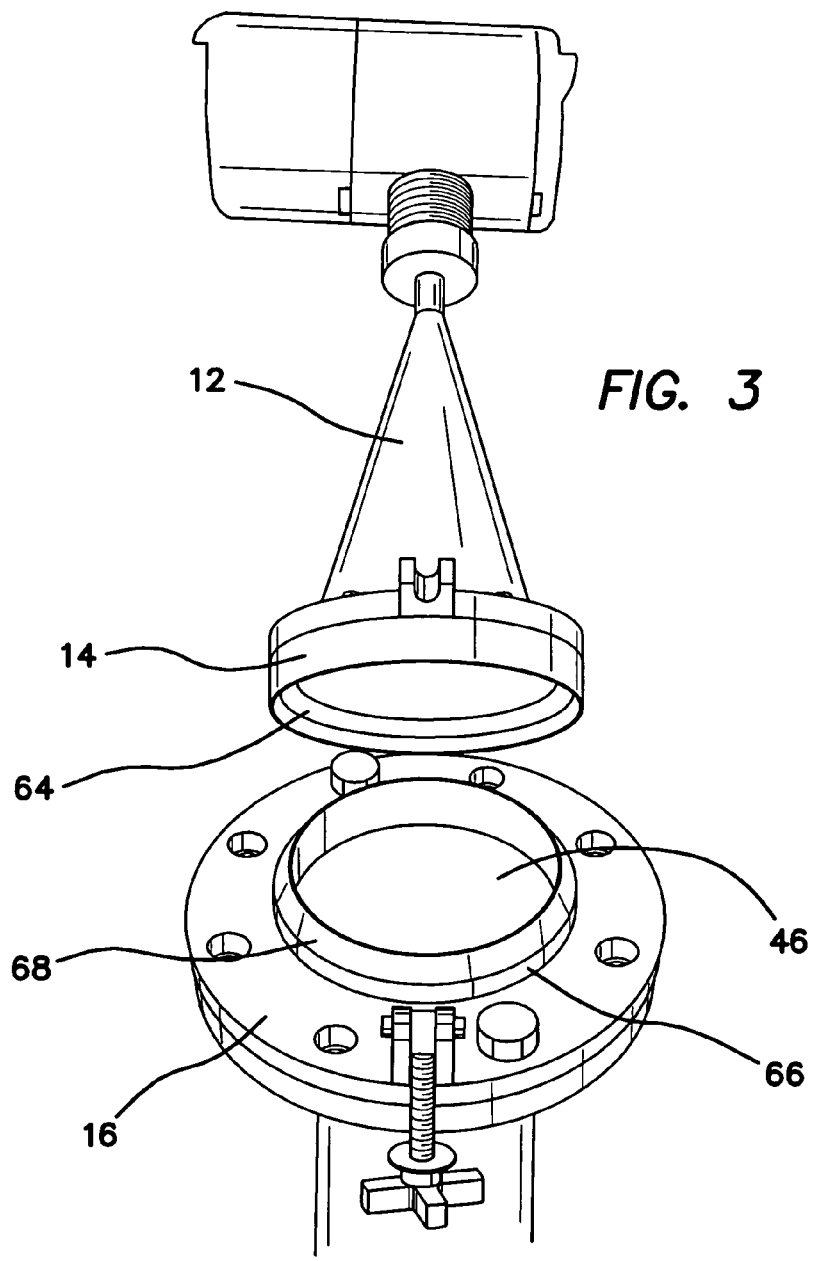
FIG. 3 is a photograph of a tank gage hatch assembly similar to that shown in FIG. 1, with the antenna separated from the gage hatch flange.

As shown in FIG. 1, when the second latch component is not secured to a first latch component 50, the shaft 56 is rotatable about the second latch component base 62 which allows the shaft 56 and the nut element 58 to be "out of the way" when it is desired to move the hinge 18 into the first position and the antenna 12 and cover 14 away from the opening 46, as shown in FIG. 3.

It should be noted that the second latch component and the first hinge component 42 are positioned at directly opposing positions on the gage hatch flange 16. This facilitates the tank gage hatch assembly 10 being self aligning when the opening 46 is to be covered by the cover 14 and antenna 12, for example, as hinge 18 is moved from the first position to the second position.

One or more other features of the present tank gage hatch assembly 10 may also facilitate or at least assist in causing the assembly to be self-aligning.

For example, with particular reference to FIG. 3, cover 14 is shown to have a ring like structure with a tapered inner surface 64, which taper is outward toward the end of cover 14 away from antenna 12. Hatch gage flange 16 includes a raised shaped element 66 which defines the opening 46. The raised shaped element 66 includes a tapered outer surface 68, which taper extends inwardly toward the top end of the gage hatch flange 16, as shown in FIG. 3. The tapers of inner surface 64 and outer surface 68 are complimentary so as to aid in self aligning the cover 14 with the gage hatch flange 16 as the hinge 18 is moved from the first position to the second position.

As shown in FIG. 1, a foot pedal 70 is shown coupled to the hinge 18 and extends generally outwardly from the hinge. The foot pedal 70 is used to move the hinge 18 from the second position, shown in FIG. 1, to a first position, for example, shown in FIG. 3. Thus, using the foot pedal 70 facilitates such movement of the hinge 18 without placing undue stress on the antenna 12 which is relatively fragile and may be sensitive to the direct application of force. For example, the antenna 12 may be and often is a hollow metal structure with a wall thickness of about 0.05 inches. Allowing an operator to use the foot pedal 70 mitigates having to place undue pressure on the antenna. In addition, the use of foot pedal 70 increases the ease of moving the hinge 18 from the second position to the first position.

Figure 2:
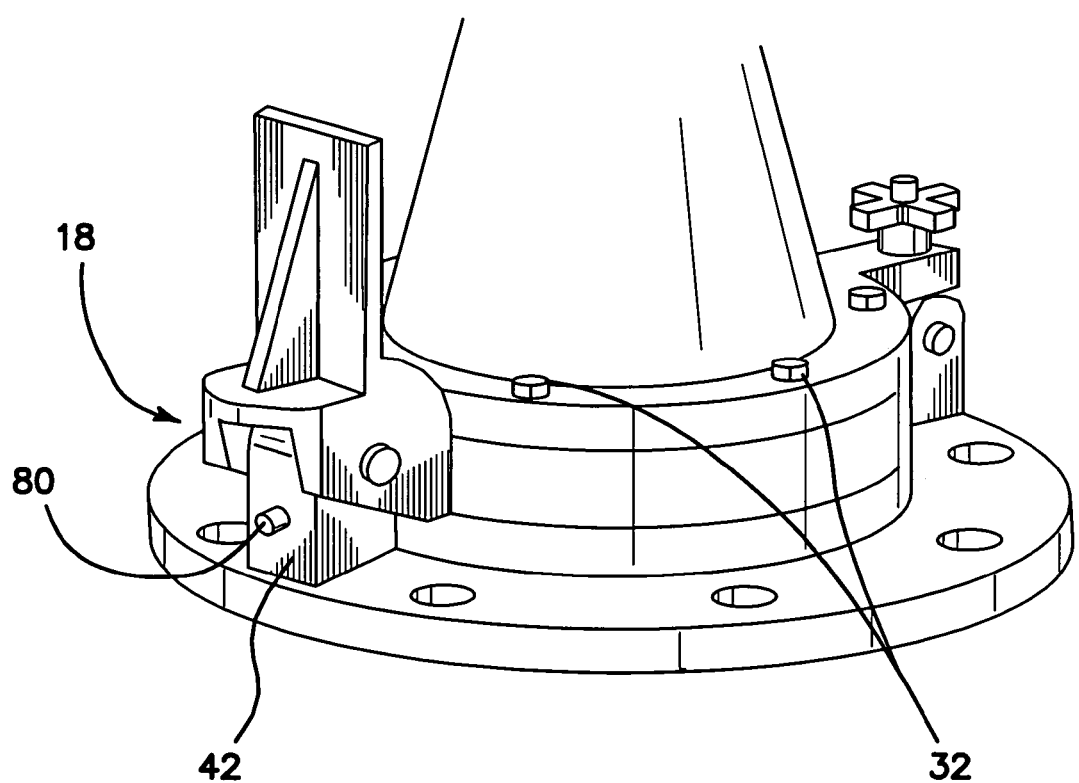
FIG. 2 is a partial view, in perspective, of a tank gage hatch assembly in accordance with the present invention similar to that shown in FIG. 1.

In order to avoid, or mitigate uncontrolled or abrupt movement of the antenna 12 as the hinge 18 moves from the second position to the first position, the movement of the hinge 18 may be cushioned to limit the occurrence and/or severity of shocks when moving the hinge 18 from the second position to the first position. As shown in FIG. 2, a cushion component 80, for example, a polymeric element and/or rubber stop and/or spring, is provided on, e.g., adhered to and/or otherwise secured to the first hinge member 42 to cushion the movement of the hinge 18 from the second position to the first position.

The movement of the antenna 12 and cover 14 relative to the gage hatch flange 16 as the hinge moves from the second position to the first position may be through an angle of about 30 degrees or less or about 45 degrees to about 90 degrees or more. The movement of the antenna 12 and cover 14 may, and preferably is sufficient to allow for another use of the opening 46 and the tank opening which at least partially coincides with the opening 46.

Figure 4:
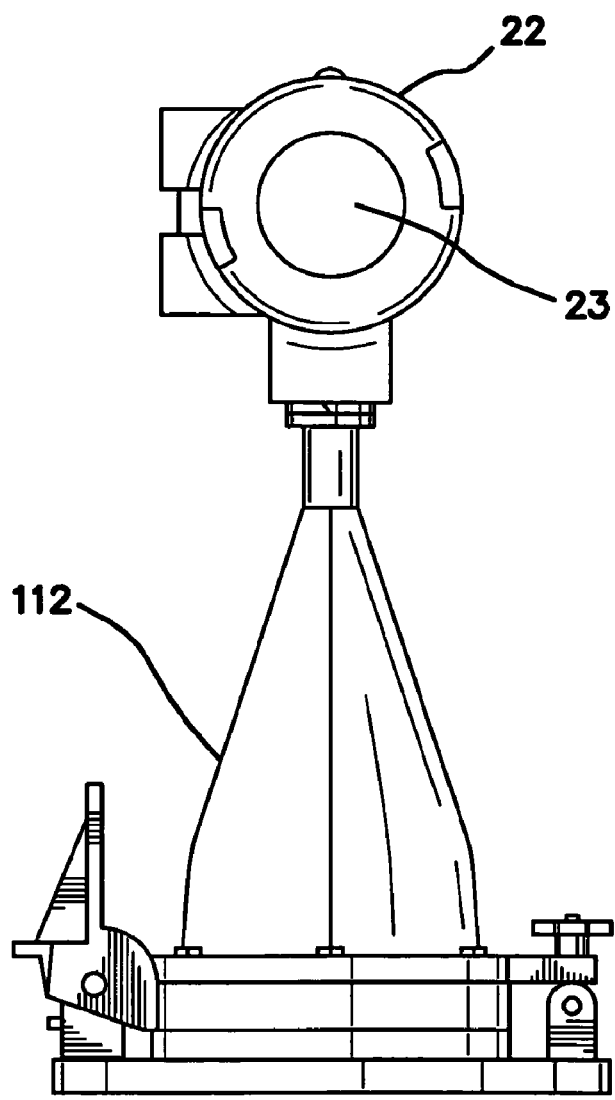
FIG. 4 is a front side view of an alternate embodiment of the tank gage hatch assembly in accordance with the present invention, with an antenna or horn having an outer surface with a substantially log taper.

The antenna can have a linear profile, such as in antenna 12 of FIGS. 1, 2 and 3; or it can have a log taper, such as in antenna 112 of FIG. 4. The log taper antenna is of particular use in still well applications.

The components of the present tank gage hatch assemblies may be made of any suitable material or materials of construction and can be made using conventional and well known manufacturing techniques. For example, many of the components may be made of metal or metals. Other components, such as the cushion components, may be made of polymers.

While this invention has been described with respect to various specific examples and embodiments, it is to be understood that the invention is not limited thereto and that it can be variously practiced within the scope of the following claims.

What is claimed is:

1. A tank gage hatch assembly comprising:
a tank gage antenna operatively couplable to a tank gage;
a cover coupled to the tank gage antenna;
a gage hatch flange including an opening, the gage hatch flange being coupled to the cover and structured to be coupled to a tank; and
a hinge comprising a first hinge member secured to the gage hatch flange, and a second hinge member secured to the cover, the hinge being movable between a first position in which the cover is spaced apart from the opening and a second position in which the antenna and cover substantially cover the opening.

2. The tank gage hatch assembly of claim 1 which is structured to be used as a replacement for a prior gage hatch assembly on an existing tank.

3. The tank gage hatch assembly of claim 1 which is structured to replace any gage hatch assembly that uses a standard size 2 inch-12 inch ANSI flange.

4. The tank gage hatch assembly of claim 1 wherein the hinge is movable from the second position to the first position without disconnecting anything on the antenna.

5. The tank gage hatch assembly of claim 1 which further comprises a first latch component secured to the antenna or cover and a second latch component secured to the gage hatch flange, the first and second latch components being structured to be coupled together when the hinge is in the second position to secure the antenna and cover in place relative to the opening.

6. The tank gage hatch assembly of claim 5 wherein the second latch component and the first hinge member are secured to the gage hatch flange at substantially mutually opposing locations.

7. The tank gage hatch assembly of claim 5 wherein the first latch component includes two spaced apart prongs extending outwardly from the antenna or cover; and the second latch component includes a shaft sized and adapted to be placed between the two prongs when the hinge is in the second position, so that the antenna and cover substantially cover the opening.

8. The tank gage hatch assembly of claim 7 wherein the shaft is threaded, and which further comprises a nut element treadably coupled to the shaft, the nut element being sized and structured to be rotated relative to the shaft, as desired, to secure the antenna and cover to the gage hatch flange when the hinge is in the second position.

9. The tank gage hatch assembly of claim 8 wherein the shaft is movable so that the shaft can be removed from between the two prongs without removing the nut element from the shaft.

10. The tank gage hatch assembly of claim 1 which is structured to be self aligning in moving the hinge from the first position to the second position.

11. The tank gage hatch assembly of claim 1 wherein the cover has a ring-like structure having an inner wall with a first taper away from the antenna; and the gage hatch flange includes a shaped element defining the opening, the shaped element includes an outer surface with a second taper which is substantially complimentary to the first taper, so that the first and second tapered surfaces are substantially in contact when the hinge member is in the second position.

12. The tank gage hatch assembly of claim 11, wherein the pedal member is coupled to the hinge, and extends generally outwardly from the hinge.

13. The tank gage hatch assembly of claim 1 wherein the cover is secured to the antenna.

14. The tank gage hatch assembly of claim 1 which further includes a pedal member secured to at least one other element of the assembly and being effective to facilitate moving the hinge from the second position to the first position.

15. The tank gage hatch assembly of claim 1 wherein the movement of the hinge is cushioned to limit the occurrence and/or severity of shocks when moving the hinge from the second position to the first position.

16. The tank gage hatch assembly of claim 15 which further comprises at least one cushion component located on the hinge and/or on the gage hatch flange to provide the cushioning.

17. The tank gage hatch assembly of claim 16 wherein the cushion component is selected from the group consisting of a spring, a polymeric element, a rubber stop and combinations thereof.

18. The tank gage hatch assembly of claim 1 wherein the antenna has an outer surface with a substantially linear taper.

19. The tank gage hatch assembly of claim 1 wherein the antenna has an outer surface with a substantially log taper.

20. The tank gage hatch assembly of claim 1 which further comprises a housing structured to at least partially contain a tank gage, the housing being coupled to the antenna.

21. The tank gage hatch assembly of claim 20 wherein the housing includes an outwardly extending port including a threaded outer surface, and the assembly further comprises an end cap located on the antenna and having an inner threaded surface so that the housing is secured to the antenna by rotating the end cap onto the port.

* * * * *

UNITED STATES PATENT AND TRADEMARK OFFICE
CERTIFICATE OF CORRECTION

PATENT NO. : 8,069,722 B1
APPLICATION NO. : 12/455277
DATED : December 6, 2011
INVENTOR(S) : Jannotta et al.

Page 1 of 1

It is certified that error appears in the above-identified patent and that said Letters Patent is hereby corrected as shown below:

Column 1

Line 2, "Application Ser. No. 61,060,058" should read --Application Ser. No. 61/060,058--.

Column 5

Line 38, "the first latch component" should read --the first latch component 50--.

Line 45, "the second latch component" should read --the second latch component 54--.

Column 7

Line 30, in claim 8, "treadably coupled" should read --threadably coupled--.

Signed and Sealed this
Sixth Day of November, 2012

David J. Kappos
*Director of the United States Patent and Trademark Office*